UNITED STATES PATENT OFFICE.

OSCAR GERLACH, OF DANVILLE, AND CHRISTIAN B. LIHME, OF CHICAGO, ILLINOIS, ASSIGNORS TO THE INDUSTRIAL RESEARCH LABORATORIES, A CORPORATION OF ILLINOIS.

PROCESS OF PREPARING PLASTIC MOLDING MATERIAL.

1,390,435.     Specification of Letters Patent.    Patented Sept. 13, 1921.

No Drawing.    Application filed December 15, 1917. Serial No. 207,219.

*To all whom it may concern:*

Be it known that we, OSCAR GERLACH, a subject of the Emperor of Germany, and CHRISTIAN B. LIHME, a citizen of the United States, and residents of the city of Danville, county of Vermilion, and State of Illinois, and the city of Chicago, county of Cook, and State of Illinois, respectively, have invented certain new and useful Improvements in a Process of Preparing Plastic Molding Material; and we do hereby declare that the following is a full, clear, and exact description of the same.

This invention has reference to a process for treating or supplying desirable properties to plastic materials, such as clay, that are to be molded or shaped in a plastic condition.

The object of this invention is to reduce the mass of molding material to a condition wherein it is suitable for facile molding, such condition being obtained by a process that is rapid and inexpensive.

Another object of this invention is to reduce the mass of molding material to a plastic condition suitable for molding purposes by the introduction or mixing therewith of an element which gives suitable plasticity to the mass.

Another object of this invention is to combine a sulfite liquor with a mass of molding material to give plasticity to the mass.

Another object of the invention is to provide a plastic molding material with qualities which will prevent adhesion of the plastic material to parts of the molding apparatus and prevent breaking and tearing of the plastic material during the process of molding the plastic material into its form.

Another object of the invention is to provide the necessary lubrication for the plastic material to prevent tearing or breaking of the plastic material as it is operated on by the molding apparatus, such lubrication being provided by combining with the mass of plastic material, ground petroleum coke.

In the making of molded articles, it is customary to use clay with suitable calcined materials and refractory materials of various kinds, which are suitably prepared and afterward thoroughly mixed in a pug-mill or other similar machine. The clay composition is then kneaded in a wet condition, and in order to obtain the proper plasticity, the clay composition, after kneading, is maintained in a damp condition for a considerable period of time and thereby aged, before being molded in its final shape. This aging not only consumes considerable time, but is a somewhat delicate process that requires considerable attention and care.

Our invention is designed to obviate this somewhat long process of aging, and to reduce the mass of clay quickly to the desired state of plasticity for molding, and consists in introducing into the mass previous to the molding, a sulfite liquor which is a by-product of pulp manufacture. This sulfite liquor, which results from pulp manufacture, is of little commercial value, and by using it for the purpose of giving the molding material its plasticity, we not only provide a process which takes very little time, but we are also able to reduce the molding material to the desired condition of plasticity with a rather inexpensive ingredient. The amount of sulfite liquor required may be readily determined by adding the liquor to the mass, and kneading it therewith until the mass assumes the desired plasticity.

As an additional step in the complete preparation of the molding material for the operation of molding, we add to the mass of molding material and thoroughly knead therewith pulverized or ground petroleum coke.

In the manufacture of retorts or similar vessels, where density of material is required, it is the practice to mold the vessels by the use of a plunger, and force the clay from a hopper into the mold. Where the clay enters the mold, there is a tendency of the clay to tear, due to adhesion of the plastic clay to parts of the molding apparatus, and to prevent this trouble, the mold is generally greased with some form of oil to prevent adhesion.

We have found that a small quantity of petroleum coke ground and thoroughly mixed with the clay mass, furnishes the desired lubrication, and prevents adhesion and breaking or tearing of the clay which is experienced when a lubricant is not used. Of course, the sulfite and petroleum coke may be introduced at any stage of the preparation of the mass previous to actual molding.

It is obvious that details of our process may be changed or varied, and we do not purpose limiting the patent otherwise than necessitated by the prior art.

We claim as our invention:

1. The process of aging materials to be used for molding purposes which comprises mixing with the material an acid solution containing sulfite liquor which acts immediately to impart to the material a plasticity such as obtained by allowing the material to stand in a damp condition for a long period of time.

2. The process of preparing material for molding purposes which consists in reducing the molding material to a plastic condition with sulfite liquor from sulfite pulp manufacture, and including a quantity of non-adhesive material to prevent adhesion to the molds.

3. The process of preparing material for molding purposes which consists in reducing the molding material to a plastic condition, and mixing therewith a small quantity of pulverized petroleum coke and forming the material in an unheated mold.

In testimony whereof we have hereunto subscribed our names in the presence of two subscribing witnesses.

OSCAR GERLACH.
CHRISTIAN B. LIHME.

Witnesses:
EARL M. HARDINE,
CHARLES W. HILLS, Jr.